United States Patent [19]

Nyman

[11] Patent Number: 5,260,726
[45] Date of Patent: * Nov. 9, 1993

[54] HANGER FOR DISPLAYING EYEGLASSES

[75] Inventor: Michael S. Nyman, Ft. Lauderdale, Fla.

[73] Assignee: Al-Site Corp., Miami, Fla.

[*] Notice: The portion of the term of this patent subsequent to Dec. 18, 2007 has been disclaimed.

[21] Appl. No.: 930,815

[22] Filed: Aug. 14, 1992

Related U.S. Application Data

[63] Continuation of Ser. No. 606,179, Oct. 31, 1990, Pat. No. 5,144,345, which is a continuation of Ser. No. 278,546, Dec. 1, 1988, Pat. No. 4,976,532, which is a continuation-in-part of Ser. No. 145,222, Jan. 19, 1988, abandoned.

[51] Int. Cl.⁵ ................................................. G02C 1/00
[52] U.S. Cl. ....................................... 351/158; 351/41
[58] Field of Search ........................... 351/41, 155:158; 223/85; 2/13; 206/5 R; 248/902, 309.1; 211/13, 59.1; 40/642, 665

[56] References Cited

U.S. PATENT DOCUMENTS

| D. 243,443 | 0/1977 | Hayashi. |
|---|---|---|
| D. 246,590 | 12/1977 | Sollazzi. |
| 239,657 | 4/1881 | Hellenperg. |
| 1,075,327 | 10/1913 | Browning. |
| 1,298,268 | 3/1919 | Wallin. |
| 1,931,286 | 10/1933 | Drew. |
| 1,952,085 | 3/1934 | Mayer. |
| 2,095,481 | 10/1937 | Skopec. |
| 2,106,615 | 1/1938 | Maurer. |
| 2,212,596 | 8/1940 | Fuller. |
| 2,656,918 | 10/1953 | Hollis. |
| 2,723,745 | 11/1955 | McNeill. |
| 2,764,286 | 9/1956 | Carmichael. |
| 3,085,725 | 4/1963 | Caparosa. |
| 3,116,829 | 1/1964 | Pacelli. |
| 3,148,812 | 9/1964 | Hillsinger, Jr.. |
| 3,172,539 | 3/1965 | Rulf. |
| 3,184,058 | 5/1965 | Crowther. |
| 3,299,439 | 1/1967 | Bohner. |
| 3,381,806 | 5/1968 | McDonagh. |
| 3,468,050 | 9/1969 | Pool. |
| 3,552,701 | 1/1971 | Montagano. |
| 3,710,996 | 1/1973 | Smilow et al.. |
| 3,738,034 | 6/1973 | Seaver. |
| 3,799,357 | 3/1974 | Govang. |
| 3,858,726 | 1/1975 | Rosenwein. |
| 4,019,632 | 3/1977 | Greenlee. |
| 4,056,192 | 11/1977 | Barrios. |
| 4,128,224 | 12/1978 | Guichard. |
| 4,441,233 | 4/1984 | Swift. |
| 4,558,788 | 12/1985 | Grothaus. |
| 4,602,602 | 3/1985 | Swanson. |
| 4,702,451 | 10/1987 | Salazar et al.. |
| 4,724,967 | 2/1988 | Valiulis. |
| 4,944,389 | 7/1990 | Robertson. |
| 4,944,436 | 7/1990 | Moen et al.. |

FOREIGN PATENT DOCUMENTS

| 0107541 | 5/1984 | European Pat. Off.. |
|---|---|---|
| 85551A76 | 4/1976 | Italy. |
| 1080539 | 5/1985 | Italy. |
| 1086173 | 10/1967 | United Kingdom. |

OTHER PUBLICATIONS

"Smurfs On Your Turf"—Advertisement, Foster Grant, 1984.
"2 Great Names Combine—Smurf"... Advertisement, Foster Grant, 1984.
Entire 1975 Catalog published by Cool Ray, Inc.
Entire 1976 Catalog published by Cool Ray, Inc.
Entire 1977 Catalog published by Cool Ray.

*Primary Examiner*—Bruce Y. Arnold
*Assistant Examiner*—Hung Xuan Dang
*Attorney, Agent, or Firm*—Peter T. Cobrin; Marvin S. Gittes; Richard I. Samuel

[57] ABSTRACT

A pair of non-prescription eyeglasses is mounted on a cantilevered support by a hanger that includes an element constructed of relatively stiff resilient plastic material. Such element includes a relatively wide main section having an aperture which receives the support arm, and a relatively narrow extension. The latter passes through the nose gap of the eyeglasses and is reversely bent to form a loop that surrounds the eyeglass frame bridge. In a first embodiment of this invention a rivet maintains the loop closed and prevents casual removal of the hanger from the eyeglasses. In a second embodiment a snap-type device holds the loop closed. This snap-type closure cannot be opened casually, at least for the first opening thereof.

2 Claims, 2 Drawing Sheets

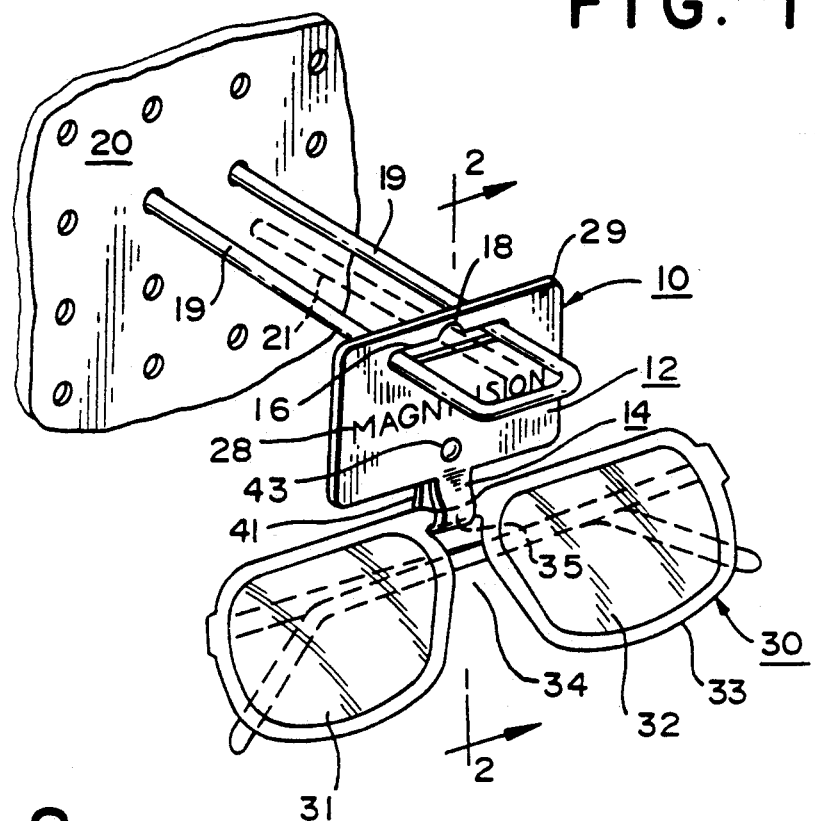
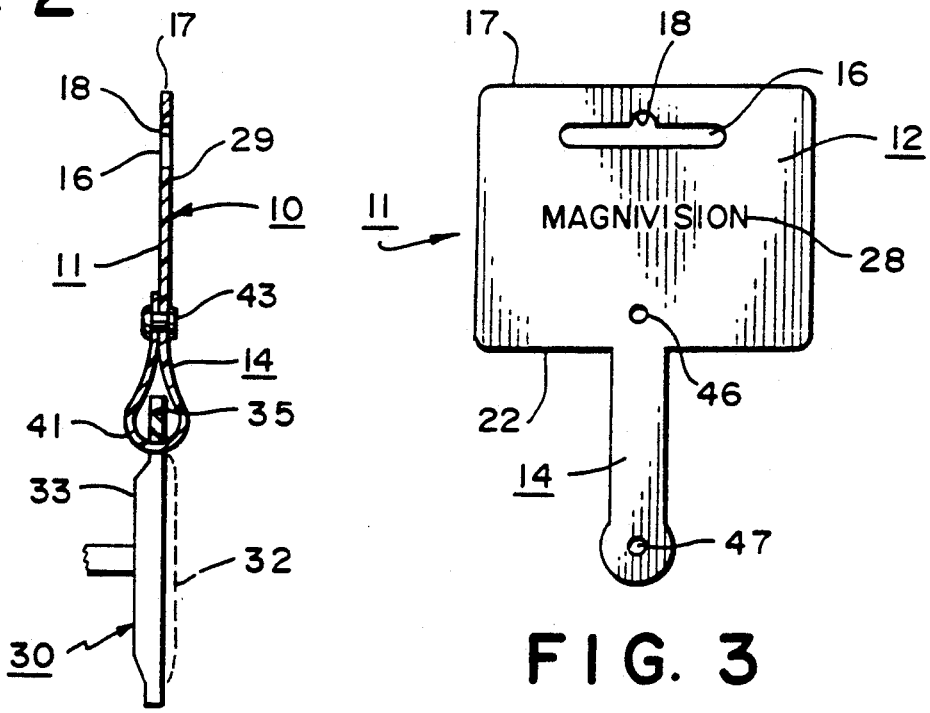

HANGER FOR DISPLAYING EYEGLASSES

This application is a continuation of co-pending application Ser. No. 07/606,179, filed Oct. 31, 1990, now issued as U.S. Pat. No. 5,144,345 which, in turn, is a continuation of application Ser. No. 278,546, filed Dec. 1, 1988, now issued as U.S. Pat. No. 4,976,532. Application Ser. No. 278,546 is a continuation-in-part of Ser. No. 145,222, filed Jan. 19, 1988, now abandoned.

BACKGROUND OF THE INVENTION

This invention relates to product displays in general and more particularly relates to hangers for displaying eyeglasses.

In many localities, non-prescription eyeglasses, otherwise known as magnifiers, are becoming increasingly available at pharmacies and other retail outlets. As contrasted with prescription eyeglasses, non-prescription eyeglasses are more easily replaced when lost or damaged, are relatively inexpensive and the inconvenience (loss of time) of being examined is avoided, as is the expense of transportation to a doctor's office instead of to a local store.

Typically, without the help of a sales person, a customer selects a pair of non-prescription eyeglasses from a display by trying on a number of pairs until he locates a pair that is comfortable both physically and optically. Generally, prior art displays for this type of eyeglasses provided an individual cubby hole for each pair of eyeglasses, whether boxed or unboxed, or there were individual positioning and holding means provided for each pair of eyeglasses. Whenever a customer removed a pair of eyeglasses, the display did not exhibit a pair of eyeglasses having the same physical size and optical properties as the pair that was removed until a store employee obtained another pair and mounted same on the display. Often this meant that certain eyeglasses of particular sizes and/or optical powers were not on display for substantial portions of the business day.

SUMMARY OF THE INVENTION

In accordance with the instant invention an individual hanger is secured to each pair of eyeglasses in such a way that the customer may try on the eyeglasses without the necessity of removing the hanger therefrom. That is, the hanger is constructed of relatively stiff resilient plastic sheet material that is provided with a loop portion that wraps loosely around the bridge of the eyeglass frames. The hanger is constructed with an aperture that receives a cantilevered bar projecting horizontally from a wall of the display, which bar may be of the single or double arm type illustrated in U.S. Pat. No. 4,502,602, issued Mar. 5, 1985 to R.K. Swanson for Display Fixture With Removable Arm For Use With Perforated Board. Each bar is intended to support a plurality of glasses of the same type (frame style, frame size and optical characteristics). A portion of the hanger may carry indicia identifying the source of the product, style number, description, size and/or optical characteristics as contrasted with stick-on labels that were used in the prior art for product identifying information.

A rivet or other fastener that is not readily removable is used to maintain the loop portion closed. The rivet or other fastener, and the hanger are strong enough so that the hanger cannot be removed casually from the eyeglasses. The rugged construction and securement of the hanger serves to reduce pilferage that was occurring when a customer readily removed a stick-on label from a selected pair of eyeglasses and wore the selected pair as he left the store without paying for the eyeglasses.

OBJECTS OF THE INVENTION

Accordingly, the primary object of the instant invention is to provide a novel construction for a product display hanger.

Another object is to provide a novel improved hanger for displaying eyeglasses.

Still another object is to provide a hanger of this type that is useful in reducing pilferage.

A further object is to provide a hanger of this type that is relatively inexpensive.

A still further object is to provide a hanger of this type that remains affixed to the product while the customer wears the product to determine whether it should be selected.

BRIEF DESCRIPTION OF THE DRAWINGS

These objects as well as other objects of this invention shall become readily apparent after reading the following description of the accompanying drawings in which:

FIG. 1 is a perspective of a hanger constructed in accordance with teachings of the instant invention, mounting a pair of eyeglasses on a cantilevered bar that protrudes from a wall of a display device.

FIG. 2 is a cross-section taken through line 2—2 of FIG. 1 looking in the direction of arrows 2—2.

FIG. 3 is a plan view of the main element for a hanger constructed in accordance with teachings of the instant invention.

DETAILED DESCRIPTION OF THE PREFERRED EMBODIMENT

Figure 4:
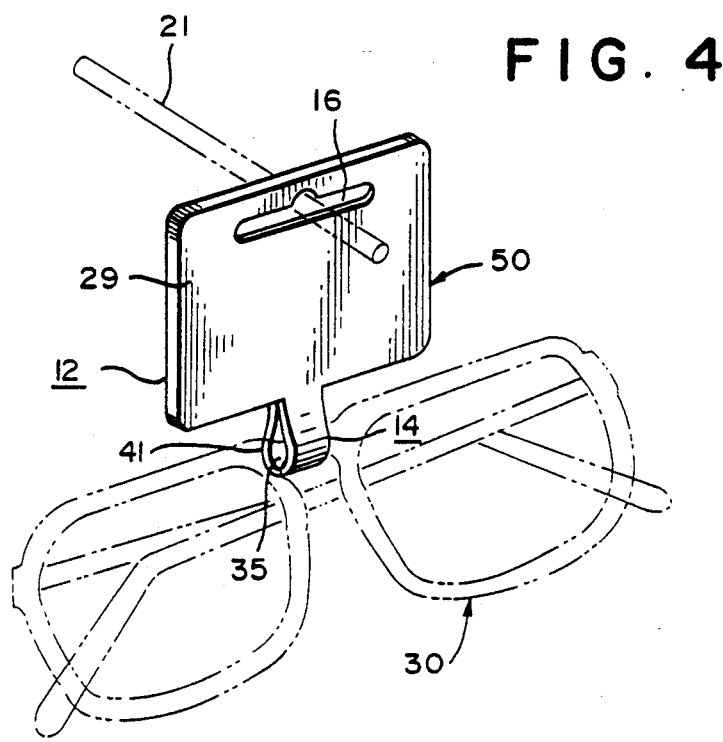
FIG. 4 is a view similar to that of FIG. 1 illustrating a second embodiment of this invention in which the fastening means is formed integrally with the other portions of the hanger.

Now referring particularly to FIGS. 1, 2 and 3. Hanger 10, constructed in accordance with a first embodiment of the instant invention, includes main element 11 (FIG. 3) which is a single sheet of relatively stiff resilient plastic material,, typically a polythene. Element 11 consists of rectangular relatively wide main section or body 12 and relatively narrow extension 14. It is intended that front surface 29 of body 12 bear identifying indicia 28. Body 12 is provided with elongated aperture section 16 that is substantially longer than the width of extension 14, and is disposed in the vicinity of and extends parallel to edge 17. Centered between the ends of aperture section 16 and extending therefrom toward edge 17 is notch-like aperture section 18. Elongated section 16 is adapted to receive a cantilevered support comprising spaced parallel arms 19, 19, which project horizontally from wall 20, while notch section 18 is adapted to receive a cantilevered support consisting of single horizontal arm 21. Extension 14 is centered along edge 22 of main section 12 and is centered with respect to the length of aperture 16. Edge 17 is parallel to edge 22 and prior to formation of loop 41 (FIG. 2), the entire extension 14 projects from edge 22 away from edge 17.

Non-prescription eyeglasses 30 is a try-on article that includes lenses 31, 32 which are positioned by frame 33 with nose gap 34 therebetween. Bridge 35 of frame 33 extends across gap 34 at the upper end thereof. Extension 14 runs through gap 34 and is reversely bent to form loop 41 that encircles bridge 35. Loop 41 is maintained closed by fastening means in the form of metal rivet 43 which extends through aperture 46 in main section 12 and aperture 47 in extension 14 near the free end thereof.

Hanger 10 and eyeglasses 30 are proportioned so that they cannot be separated without opening loop 41. However, there is sufficient play between hanger 10 and eyeglasses 30 to permit a customer to try on the latter without removing hanger 10. When eyeglasses 30 are being fitted, main section 12 is intended to be in front of the customer's forehead in a position that does not interfere with the customer's view or effect positioning of eyeglasses 30.

While the FIG. 1 illustrates only a single pair of eyeglasses 30 and its hanger 10 mounted on support arms 19, 19, it should now be apparent to those skilled in the display art that support arms 19, 19 and/or 21 are intended to support a plurality of pairs of eyeglasses 30 each secured to an individual hanger 10. It should also now be apparent to those skilled in the art that loop 41 need not be formed integrally with body 12, but can be formed by a separate member (not shown) that is attached to body 12 by fastening means which may be the same rivet 43 that is used to maintain loop 41 closed.

Figure 5:
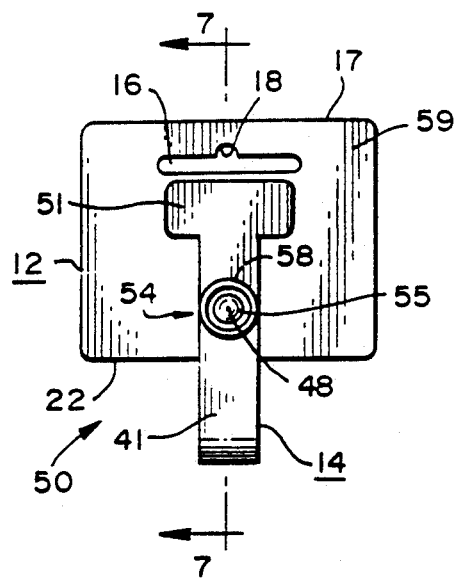
FIG. 5 is a rear view of the second embodiment of the invention.
Figures 6, 7:
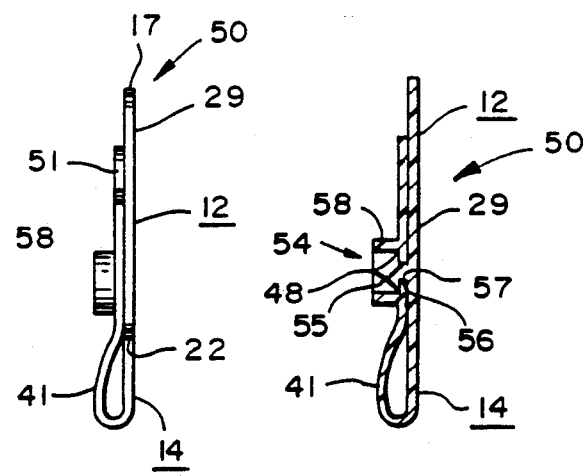
FIG. 6 is a side elevation looking in the direction of arrows 6—6 in FIG. 5.
FIG. 7 is a cross-section taken through line 7—7 of FIG. 5 looking in the direction of arrows 7—7.

Now referring to FIGS. 4 through 7 which illustrate a second embodiment of the instant invention. Where elements of the first and second embodiments are the same or substantially the same like reference numerals are used to indicate these elements in the drawings for both of the embodiments. In particular, hanger 50 of FIGS. 4-7 is constructed of a moderately stiff yet flexible plastic material and consists of relatively wide rectangular main section or body 12, relatively narrow body extension 14 and fastening means 54. Typically, components 12, 14 and 54 are integrally formed by molding and/or stamping.

Extension 14 projects from the center of one of the long sides 22 of body 12. Narrow slot 16, to receive cantilever support elements 19, 19, is disposed adjacent the other long side 17 of body 12. Extension 14 is centered with respect to the length of slot 16 and extends away from edge 17. Fastening means 54 includes conical button 55 which is disposed slightly to the rear of body 12 near edge 22 and is connected thereto by shank 57 which extends to the base of button 55. The length of shank 57 is approximately equal to the thickness of body 12.

To form loop 41 around bridge 35 of eyeglasses 30, the free end of extension 14 is rearwardly bent and button 55 is forced through aperture 57 in extension 14 near transverse tab 51 which is at the free end of extension 14. Molded integrally with extension 14 is barrier 58 which surrounds button 55 when loop 41 is closed and is provided with an inside diameter which is equal approximately to the outer (base) diameter of button 55. The height of barrier 58 is equal approximately to the height of button 55 which is measured from its enlarged base to its rearward facomg relatively pointed apex or tip 48. Barrier 58 prevents pointed tip 48 from pressing into the forehead of a person who is trying on eyeglasses 30. The first time loop 41 is formed, considerable force is required to insert button 55 through aperture 57. Reinforcement provided by barrier 58 and the nature of the material from which hanger 50 is constructed are such that after the first time button 55 travels through aperture 57, loop 41 cannot be opened casually. However, after button 55 moves through aperture 57 in both directions, aperture 57 becomes enlarged to the extent that fastening means 54 no longer provides a secure connection between the free end of extension 14 and body 12.

Transverse tab 51, located at the free end of extension 14 and outboard of aperture 57, constitutes a grip to facilitate opening of the connection made by fastening means 54. While extension 14 is substantially narrower than slot 16, tab 51 is almost the length of slot 16. Even by gripping tab 51 considerable effort must be exerted for initial opening of loop 41.

Although the present invention has been described in connection with a preferred embodiment thereof, many other variations and modifications will now become apparent to those skilled in the art. It is preferred, therefore, that the present invention be limited not by the specific disclosure herein, but only by the appended claims.

What is claimed is:

1. The combination of an eyeglass display member and an eyeglass hanger member comprising:

an eyeglass display member having an exterior surface;

a cantilever support extending outwardly in a first direction from said eyeglass display member exterior surface;

an eyeglass hanger member for mounting a pair of eyeglasses, said pair of eyeglasses including first and second lenses and a frame, said frame including temples and said first and second lenses mounted in said frame in a side-by-side relationship with a gap therebetween, said frame further including a bridge portion extending across said gap, said temples being pivotable with respect to said lenses within said frame and selectively movable between a folded, closed position when the eyeglasses are hung from the eyeglass display member and an unfolded, open position in which the temples are substantially perpendicular to said lenses to enable the eyeglasses to be tried on by a potential user;

said eyeglass hanger member having an attaching portion attachable to a portion of said frame of said pair of eyeglasses to enable the temples of the frame to be selectively displaced between said closed position and said open position, said attaching portion locating at least a portion of said eyeglasses at a position below said eyeglass hanger member when said attaching portion is attached to said portion of said frame and in a manner such that the eyeglass hanger member does not interfere with a potential user's view through the lenses when the eyeglasses are tried on;

said cantilever support engaging said eyeglass hanger member to maintain a selected orientation for the eyeglasses while said eyeglass hanger member is slidably movable thereon; and said cantilever support engaging said eyeglass hanger member in a manner to position the eyeglasses associated therewith so that when the temples of said eyeglasses are in a folded, closed position said temples do not penetrate the display member exterior surface and are substantially parallel to the folded temples of any other pair of eyeglasses whose eyeglass hanger member is supported by said cantilever support thereby allowing a plurality of said eyeglass hanger members to be supported thereon.

2. A method of displaying eyeglass/hanger combinations, the eyeglasses including (i) first and second lenses, (ii) a frame for mounting the first and second lenses in a side-by-side relationship with a gap therebetween, (iii) a bridge portion extending across the gap, and (iv) temples pivotable with respect to the lenses in the frame, the eyeglass hangers having an attaching portion attached to a portion of the frame of an associated pair of eyeglasses, such that the eyeglass hanger does not interfere with a potential user's view through the lenses when the eyeglasses are tried on; including the steps of:

locating a display member in a selected location for display of the eyeglasses, the display member having an exterior surface and at least a first cantilever support attached to the exterior surface of the display member so that the cantilever support extends outwardly in a first direction from the eyeglass display member exterior surface, mounting the eyeglass hanger on the cantilever support so that the temples of the frame can be selectively displaced between a folded, closed position when the eyeglasses are hung from the eyeglass display member and an unfolded, open position, in which the temples are substantially perpendicular to the lenses, to enable the eyeglasses to be tried on by a potential user;

the mounting step including the step of positioning the eyeglass hanger with the cantilever support engaging the eyeglass hanger in a manner to position the eyeglasses associated therewith in a selected orientation and with the temples in a closed position substantially perpendicular to the cantilever support, so that the temples do not penetrate the display member exterior surface and are substantially parallel to the folded temples of any other pair of eyeglasses whose eyeglass hanger is supported by the cantilever support, allowing a plurality of the eyeglass hangers to be supported thereon.

* * * * *